UNITED STATES PATENT OFFICE.

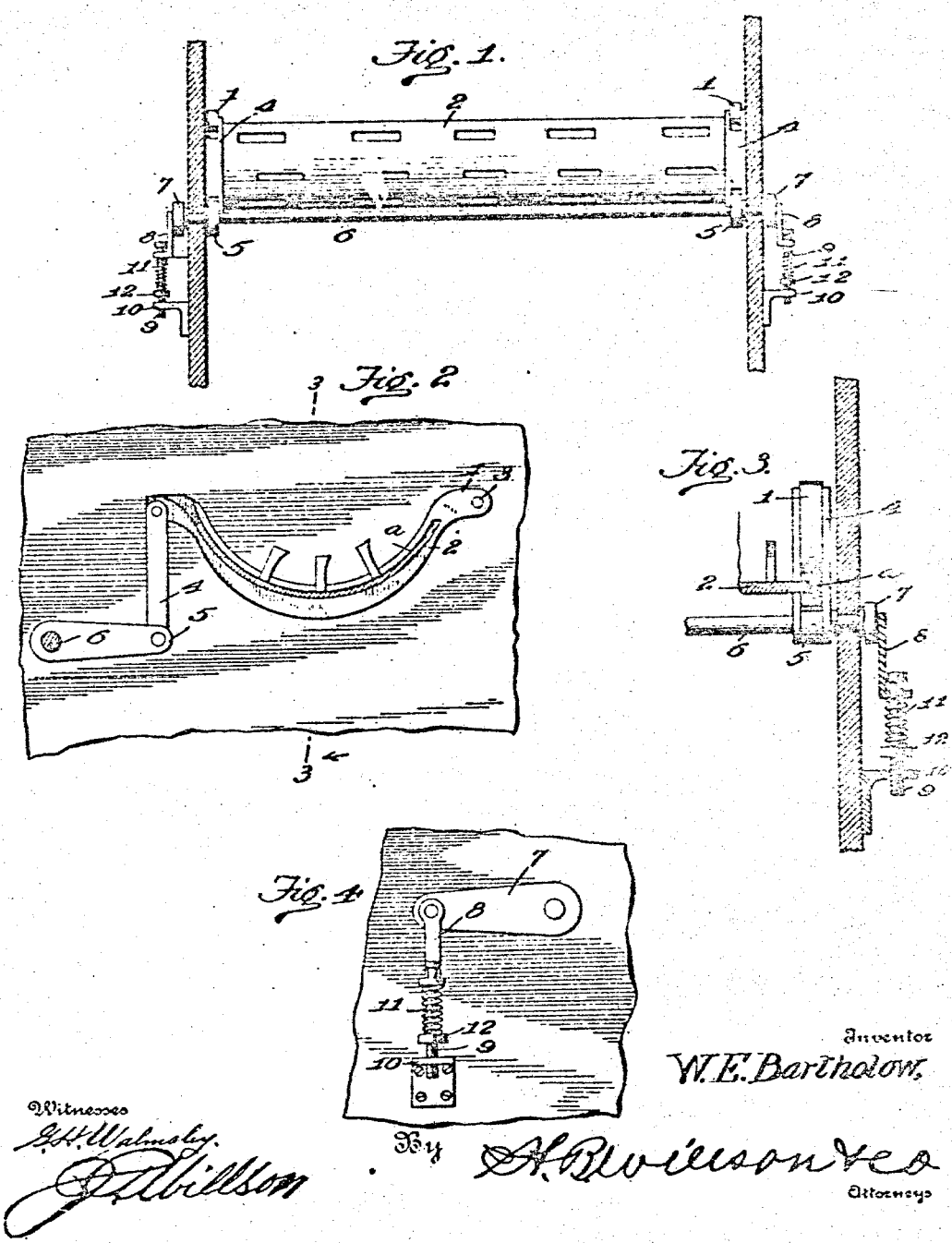
No. 740,215. PATENTED SEPT. 29, 1903.
W. E. BARTHOLOW.
SUPPORT FOR CONCAVES.
APPLICATION FILED MAY 9, 1902.
NO MODEL.
Inventor
W. E. Bartholow No. 740,215.                                    Patented September 29, 1903.

WILLIAM E. BARTHOLOW, OF SALEM, SOUTH DAKOTA.

SUPPORT FOR CONCAVES.

SPECIFICATION forming part of Letters Patent No. 740,215, dated September 29, 1903.

Application filed May 9, 1902. Serial No. 106,526. (No model.)

*To all whom it may concern:*

Be it known that I, WILLIAM E. BARTHOLOW, a citizen of the United States, residing at Salem, in the county of McCook and State of South Dakota, have invented certain new and useful Improvements in Supports for Concaves; and I do declare the following to be a full, clear, and exact description of the invention, such as will enable others skilled in the art to which it appertains to make and use the same.

The invention relates to a yielding support for the concaves of threshing-machines.

The object of the invention is to provide a support which is simple of construction, effective in action, and designed to allow the concave to yield or drop down when liability of choking the cylinder and concave occurs, as when a compact mass of heavy or wet grain is fed into the concave, thus relieving the concave and cylinder of excessive strain and obviating danger of injury thereto.

With this and other objects in view, which will readily appear as the nature of the invention is better understood, said invention consists in certain novel features of construction and combination and arrangement of parts which will be hereinafter fully described, defined in the appended claim, and illustrated in the accompanying drawings, in which—

Figure 1 is a vertical transverse section through the chamber of a threshing-cylinder, showing the application of the invention. Fig. 2 is a vertical longitudinal section of the same. Fig. 3 is a vertical transverse section on line 3 3 of Fig. 2. Fig. 4 is a side detail elevation showing one of the resistance-springs and connections.

Referring now more particularly to the drawings, the numeral 1 represents segmental supporting-arms provided with longitudinal grooves *a* to receive the side edges of the concave 2, which is inserted in and withdrawn from said grooves by an endwise-sliding movement.

The rear ends of the arms 1 are hinged or pivoted, as shown at 3, to the thresher-frame, so that the support may swing within a prescribed arc in a vertical plane, and the front ends of the arms have depending therefrom links 4. These links connect the arms with cranks 5 on a rock-shaft 6, which extends transversely of and is journaled in the walls of the frame. The shaft is provided at its ends, which project to the exterior, with other cranks 7, pivotally connected to arms 8, which slide vertically on guide rods or bolts 9, whose lower portions are screw-threaded and fit in threaded openings in guide brackets 10, fixed to the frame. Surrounding each guide rod or bolt is a coil-spring 11, which bears against the arm 8, and engaging the threaded surface of the rod or bolt is an adjusting-nut 12, by means of which the tension or resistance of the spring to the downward movement of the arm 8 may be regulated. It will thus be seen that the two springs 11 yieldingly hold the concave and concave-support in their normal positions in which the concave is spaced the usual distance from its cylinder.

When a mass of grain too heavy for the cylinder to handle is fed into the concave, the increased pressure on the concave forces the concave and arms downward and rocks the shaft 6 in one direction against the resistance of the springs 11, thereby increasing the distance between the concave and cylinder and giving the mass of grain freedom to spread and loosen up by which the concave and cylinder are relieved of strain and the latter permitted to freely operate to thresh the grain and clear the concave. As soon as the amount of grain remaining in the concave is decreased to the normal the springs 11 expand, rocking the shaft 6 in the reverse direction and forcing the cranks 5 and 7 upward and restoring the concave and arms to their normal positions.

By the use of the shaft 6 and by mounting the parts in the manner described the pressure of the springs is equally distributed and the concave accurately balanced.

From the foregoing description, taken in connection with the accompanying drawings, it is thought that the construction, mode of operation, and advantages of my improved support will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In an automatically-adjustable concave for threshing-machines, the combination with a thresher-frame; of segmental arms pivoted at one end to said frame, a concave supported by said arms, a rock-shaft journaled in the frame and having exteriorly-projecting ends and two sets of crank-arms, one set within and the other without the frame, links connecting the free ends of the segmental arms to the first-named set of crank-arms, and variable resistance means on each side of the thresher-frame, the same comprising a vertically-movable guided member connected to the adjacent outer crank-arm, a spring resisting the downward movement of said member, and means for regulating the tension of said spring, substantially as described.

In testimony whereof I have hereunto set my hand in presence of two subscribing witnesses.

WILLIAM E. BARTHOLOW.

Witnesses:
E. H. WILSON,
H. L. GRIMM.